April 24, 1945.    J. R. LEISURE    2,374,548
NUT ANCHOR
Filed July 1, 1942    2 Sheets-Sheet 2
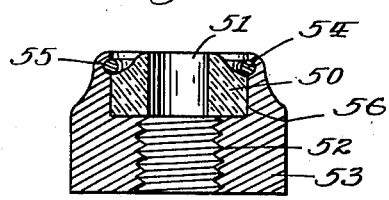
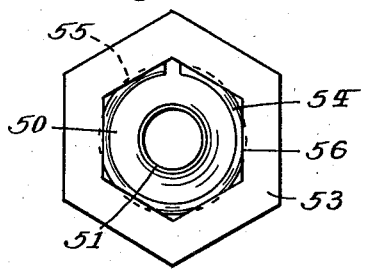
INVENTOR.
James R. Leisure,
BY
Attorney Patented Apr. 24, 1945

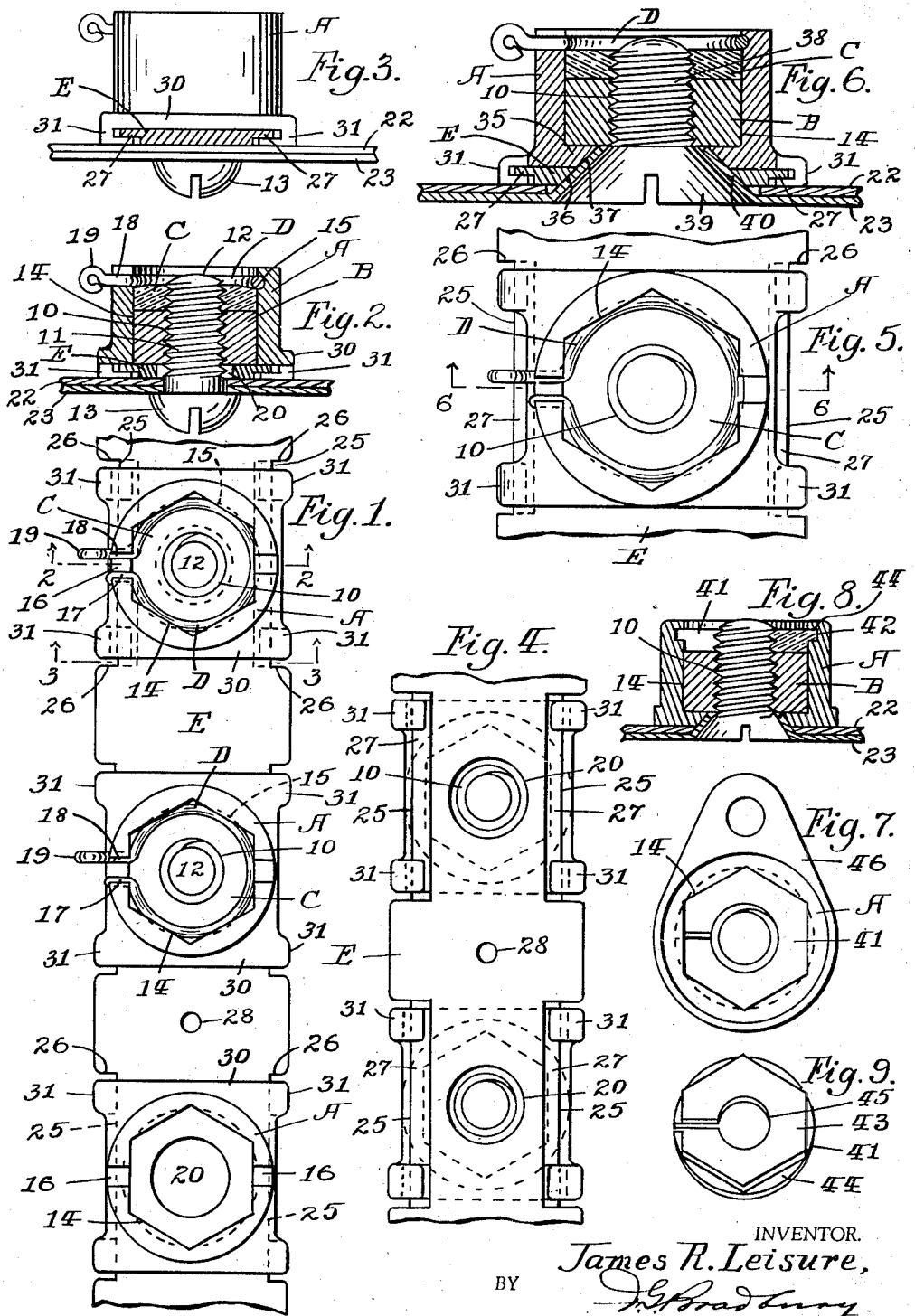

2,374,548

UNITED STATES PATENT OFFICE 2,374,548

NUT ANCHOR

James R. Leisure, Compton, Calif.

Application July 1, 1942, Serial No. 449,289

2 Claims. (Cl. 85—32)

This invention relates to improvements in nut anchors of that type in which a nut is releasably held against turning so that a bolt, screw or other fastener can be easily engaged and locked against unintentional loosening. An object of the invention is to provide a nut holding shell of the type stated with a removably inserted retaining element such as a catch, whereby the nut, while being held from turning is also removably held to permit ready removal and renewal of a worn nut or other part. A further object is to provide a readily removable lock element which I term a "clinch annulus." This annulus is removable by removing from the anchor and normally functions to bind and hold a bolt, screw or other fastener to prevent loosening. A further object is to provide novel and improved means by which a series of nut anchors of the type stated above can be mounted in selected spaced position on a clip so that a gang of said anchors can be secured on a structure ready for use. A still further object is to hold the members of a gang of nut anchors in limited movable position over fastener receiving apertures in the clip so that the nuts and their companion clinch elements can be made to coincide with the shanks of bolts, screws or other fastening elements projected through said apertures. Among further objects are maximum simplicity in construction, greater effectiveness, the saving of expense and time; and the ready renewal of worn parts.

With these and other objects in view, my invention comprises the features of construction and combination of parts hereinafter described and claimed.

This application is a continuation in part of my companion application filed November 24, 1941, bearing Serial Number 420,169.

In the accompanying drawings, forming part of this specification, Fig. 1 is a plan of my improved clip showing a series of my improved nut anchors mounted thereon, two of said anchors being shown when containing a nut and clinch element, and the remaining anchor being shown when empty; Fig. 2 is a section taken on line 2—2 of Fig. 1; Fig. 3 is a section taken on line 3—3 of Fig. 1; Fig. 4 is a plan looking at the back of a portion of the structure shown in Fig. 1; Fig. 5 is a plan of an alternative construction of my invention; Fig. 6 is a section taken on line 6—6 of Fig. 5; Fig. 7 is a plan of another alternative construction; Fig. 8 is a section in a central vertical plane of the alternative construction shown in Fig. 7 when the nut anchor shell is mounted on a multiple anchor clip instead of an individual flat or flanged base as in Fig. 7; Fig. 9 is a bottom plan slightly in perspective of the lock clinch element employed in the structure shown in Figs. 7 and 8; Fig. 10 is a central vertical section of an alternative construction of the nut in which the clinch annulus is detachably seated instead of above the nut, and Fig. 11 is a plan of the structure shown in Fig. 10.

My invention includes in its structure a nut anchor shell having a body A, bounded by a continuous wall, open at its upper and lower ends and forming a socket to freely receive and hold a nut B or other article, said wall and article having engaging portions by which the article is prevented from rotating in said shell. The particular nut shown has polygonal sides and the inner wall of the shell has corresponding polygonal sides 14 which function as said engaging portions. The nut is of usual type, its body having a threaded bore 10 which is adapted to receive and engage the threaded shank 11 of the bolt 12, screw or other fastener, on which the usual integral head such as 13 is formed. C is an elastic clinch annulus forming the lock element which is composed of pressed fiber or other suitable material. The clinch annulus resembles a disc and has polygonal sides corresponding with the polygonal side walls 14 of the inner surface of the nut anchor shell so as to removably engage the shell but prevent rotation of the bolt or other fastener secured to the nut therein. D is an expansible catch resembling a split spring loop which engages in an annular groove 15 in the inner wall of the shell above the lock element C to hold the nut and lock element assembled in the nut anchor shell. The wall of the nut anchor shell has transverse channels 16 connecting with the annular catch engaging groove 15 to receive the ends 17 and 18 of catch D. The end 17 of the catch hooks over a side wall of one of the channels 16 to anchor the catch while the opposite end 18 rests against the opposite wall of said channel and is formed with a hand grip 19 by which the operator can contract and remove the catch from the nut anchor shell to permit removal of the lock clinch element C and nut B when and as desired. The spring annular catch D may be constructed without end pieces 17 and 18 and sprung into the engaging groove 15 with or without using the transverse channels 16 in the wall of the shell, in which event the catch can be removed by prying it loose from the nut anchor shell to permit the nut and clinch annulus being removed from within the shell.

The lower end of the nut anchor shell is provided with a comparatively thin base 30 having polygonal sides resembling a square or other suitable angular shape, the pair of longitudinal sides of which have clip engaging gibs 31 near each corner of the base as will be hereinafter described. E represents a clip upon which a series or gang of the nut anchor shells is adapted to be mounted in position for use on any structure desired such as the pair of plates 22 and 23, shown in Figs. 2 and 3. The clip resembles a band or strip of thin metal or other suitable material having parallel side edges and apertures 20 at suitable longitudinally spaced intervals to suit requirements for locating fasteners such as bolts 12, in position for use. The side edges of the clip opposite each aperture has a pair of longitudinal inlets 25 with stop shoulders 26 at the opposite ends of each inlet. The inner edge of each inlet is formed with a longitudinal tongue 27 by undercutting the body of the band. In this manner a pair of parallel longitudinally disposed tongues such as 27 is provided opposite each aperture 20. In use the base of the nut anchor shell is planted flat upon the surface of the band with its base in approximate registration over an aperture 20 and in this position it is held by the gibs 31 which engage downwardly and inwardly over the tongues 27 flush with the lower surface of the band to prevent the nut anchor shell, with a nut and lock clinch annulus therein, from rotating when the bolt or other fastener is engaged or disengaged.

The inlets 25 are slightly longer than the length of the base of the nut anchor shell to permit limited longitudinal movement of the shell on the clip and the connection between the gibs 31 and tongues 27 is sufficiently loose to permit slight free movement of the shell laterally on the clip. These free connections are for the purpose of permitting the shell being adjusted to register the bore of the nut and the bore of the lock clinch annulus in the shell with the shank of a fastener when the latter is applied to clamp the plates 22 and 23 tightly engaged below the clip. The aperture 20 is larger in diameter than the diameter of the shank of the fastener bolt 12. The clip with a series or gang of the nut anchoring shells is adapted to be mounted in position for use on one of the plates, such as 22, by riveting, welding or other fastening means, not shown, applied when desired through the rivet receiving openings, such as 28. Normally the gibs 31 engage the tongues 27 freely without binding and with their outer portions substantially in alignment with the outer side edges of the band to avoid objectionable projections.

In use a nut (B), lock clinch annulus (C), and retaining catch (D) are assembled in each nut anchor shell as shownd in the drawings. The bolt or other threaded fastener is then applied through the plates such as 22 and 23 to be fastened, with its shank tightly screwed into engagement with the nut and lock clinch annulus. During this operation both the nut and clinch annulus are held from turning on the clip by the anchor shell. To loosen, remove and reapply the lower structural plate 23, the bolt is first removed leaving the clinch annulus in more or less worn condition. To replace the clinch annulus the spring catch can easily be removed and a fresh lock clinch element inserted over the nut and the catch reapplied. In this manner it is not necessary to remove or replace the nut. However by removing the spring catch both the nut and clinch annulus can be removed and either or both replaced. Thus, when desired, the clinch annulus can be placed below instead of above the nut in the nut anchor shell with substantially equal effectiveness to prevent the bolt or other fastener from loosening while the nut anchor shell performs its functions of restraining the nut and clinch annulus from rotating. By applying the lock clinch annulus independently and separate from the nut, saving is made of material and expense when adjustments are made.

Figs. 1 to 4 inclusive, the nut B in the nut anchor shell A is shown resting directly upon the surface of the clip, while in Figs. 5 and 6 a slight modification provides an inwardly projecting annular shoulder 35 upon which the nut and the clinch annulus are supported above and independently of the clip. Also countersunk openings 36 and 37 upwardly through the clip and said supporting shoulder admit the threaded shank 38 and flat head 39 of the bolt upwardly into nut engagement while the head of the screw may lie flush with the outer surface of the lower plate 23 to prevent objectionable projections. This construction also permits cupping of the outer plate at 40 below the head of the screw to provide a more substantial fastening means for the plate by the screw. In this modified construction, the independently removable clinch annulus for locking the bolt and nut together is also employed. The longitudinal and lateral adjustments also function in this structure as in the preferred form to self adjust the nut anchor shell with its nut and lock clinch elements juxtaposed into engaging position with the shank of the bolt.

As shown in Figs. 7 to 9 inclusive, the construction is similar to that shown in Figs. 5 and 6, except that the lock clinch annulus 41 for locking the fastener, bolt and nut together is split laterally so as to spring into engagement in an inner annular groove 42 in the inner wall of the nut anchor shell A. In this manner the use of a separate catch such as D is obviated, thus simplifying construction. The lock clinch annulus, like in the construction above described is made out of elastic material such as pressed fiber or other suitable material and can be formed in a spiral strip cut into single convolutions, each of desired length to permit springing into the retaining groove 42, where it is retained. The lock clinch annulus is formed with a polygonal sided body 43 corresponding with the flat sides of the inner surface of the nut anchoring shell to prevent turning when the fastener bolt is fastened through the nut. The lock clinch annulus is also formed with a protuberance in the form of an annular shoulder 44 adjacent to its body, which engages in the groove 42 to retain the clinch annulus in the shell. In this construction as in the constructions above set forth the lock clinch annulus has a bore 45 of slightly less diameter than the outer diameter of the shank of the screw or other fastener which is used in the companion nut so that when the screw is driven home the elastic material constituting the clinch annulus is upset or impressed to bind and clinch the annulus and lock the fastener from loosening on the nut, while in turn the nut is simultaneously prevented from rotating and loosening by the anchor shell.

In Fig. 7 the nut anchoring shell is similar in construciton to that shown in Figs. 8 and 9, excepting that the shell is mounted on a flat or flanged base 46 for supporting it on other than a gang clip.

In the above constructions the bore through the lock clinch annulus is preferably slightly less in diameter than the diameter of the root of the thread on the shank of the bolt or other fastener with which the nut and the clinch annulus cooperate, whereby as the bolt is applied by revolving, the thread tightly engages and impresses itself into the fiber of the clinch annulus. This clinching action which occurs prevents axial play and loosening of the bolt on the nut while the nut in turn is prevented from rotating and loosening by the nut anchor shell.

In Figs. 10 and 11 the elastic clinch annulus 50, made out of pressed fiber or other suitable material and having a bore 51, slightly less in diameter than the threaded bore 52 of the nut 53 is seated in the nut in axial alignment with said threaded bore and is removably retained in its seat in the nut by the removable split spring fastener loop, which engages in the annular channel 55 over and engaging the annulus 50. The clinch annulus has flat exterior sides 56 and the seat in the nut is correspondingly flat sided as shown in Fig. 11, to prevent the annulus from rotating about its axis in the nut. The clinch annulus can thus be easily and quickly removed without discarding the nut, which is a saving and a distinct advantage.

In the above specifications, I have described a nut, an independent clinch annulus, and a nut anchor shell, said elements having engaging portions formed to hold the nut and the clinch annulus from rotating in said shell, said portions consisting of flat engaging sides. I have also described a nut holding shell and a clip, said elements having portions which engage to prevent the shell from rotating on the clip, consisting of gibs which permit limited longitudinal and lateral movement of the shell to juxtapose the nut over a fastener such as the shank of a bolt. These engaging features may be variously modified within the spirit of the invention to perform the same functions and to accommodate articles varying in shape, type and kind.

I have also described the lock clinch annulus as being removably applied above, below or in the nut in the anchor shell and said annulus and shell as having cooperating portions for preventing the annulus from turning in the shell. These features may also be variously modified and still perform their functions within the spirit of the invention.

I have further described the catch D as a split spring annulus loop normally held in the annular channel 15 and having outstanding arms 17 and 18 which are retained in the channel 16 in the outer end of the nut anchor shell. This catch may be employed without said arms or said channel for holding the nut and the clinch annulus in the socket of the shell. When thus employed the loop can be pried loose and removed from the shell so as to permit removing and replacing the clinch annulus and/or the nut, easily and quickly.

In accordance with the patent statutes I have described the principles of operation of my invention together with the construction thereof which I now consider to represent the best embodiment thereof, but I desire to have it understood that the structure shown is only illustrative and that the invention can be carried out by other means and applied to uses other than those above set forth within the scope of the following claims.

I claim:

1. A multiple anchor structure, comprising, a substantially flat band providing a flat support for anchor shells having fastener receiving apertures at longitudinally spaced intervals therethrough, a pair of inlets in the opposite side edges of said band opposite each aperture, each of said inlets being provided with stop shoulders at its longitudinal ends and an undercut longitudinal edge forming a tongue, and an anchor shell having an open base resting upon the surface of said band over each of said apertures and having gibs on its opposite side edges slidably engaged over the tongues in said inlets and having limited movement longitudinally between the stop shoulders to provide adjustment of the anchor shell over a companion aperture.

2. A multiple anchor structure for supporting nut anchor shells, each shell having downwardly and inwardly projecting gibs on its lower end, said anchor structure, comprising, a substantially flat band providing a support for said anchor shells having a series of oppositely disposed pairs of inlets in its side edges, each inlet having stop shoulders at its longitudinal ends and an under-cut longitudinal edge between said shoulders forming a lateral tongue by which the gibs on said anchor shells may engage said band and retain the anchor shells between the shoulders of each inlet with said gibs held within the inlets without protruding below the lowermost surface or beyond the side edges of the band.

JAMES R. LEISURE.